United States Patent [19]
Kim

[11] Patent Number: 6,104,360
[45] Date of Patent: Aug. 15, 2000

[54] APPARATUS AND METHOD FOR CONTROLLING A MONITOR USING FIRST AND SECOND COLOR SIGNALS

[75] Inventor: Yong-Hee Kim, Suwon, Rep. of Korea

[73] Assignee: SamSung Electronics Co., Ltd., Kyungki-do, Rep. of Korea

[21] Appl. No.: 08/802,199

[22] Filed: Feb. 18, 1997

[30] Foreign Application Priority Data

Feb. 17, 1996 [KR] Rep. of Korea .......................... 96-3967
Mar. 29, 1996 [KR] Rep. of Korea .......................... 96-9318

[51] Int. Cl.$^7$ ....................................................... G09G 1/06
[52] U.S. Cl. ................................. 345/11; 345/12; 345/14
[58] Field of Search ................................. 345/14, 10, 11, 345/12, 13, 156

[56] References Cited

U.S. PATENT DOCUMENTS

| | | |
|---|---|---|
| 5,389,952 | 2/1995 | Kikinis . |
| 5,389,982 | 2/1995 | Kikinis . |
| 5,457,473 | 10/1995 | Arai et al. . |
| 5,483,260 | 1/1996 | Parks et al. .............................. 345/156 |
| 5,493,340 | 2/1996 | Kim . |
| 5,532,719 | 7/1996 | Kikinis . |
| 5,550,556 | 8/1996 | Wu et al. . |
| 5,602,567 | 2/1997 | Kanno ........................................ 345/11 |

*Primary Examiner*—Steven J. Saras
*Assistant Examiner*—Alecia D. Nelson
*Attorney, Agent, or Firm*—Robert E. Bushnell, Esq.

[57] ABSTRACT

A monitor control device for use in a CRT-type of monitor which receives video signals and synchronizing signals from a host computer and provides a visual display of information on a screen. The monitor control device includes a polarity converter for converting polarities of synchronizing signals into the same polarity; a bias adjusting circuit for receiving a first color signal including a first clock signal and a second color signal including a monitor control information signal, and adjusting respective DC bias voltages of the first and the second color signals to a zero level so as to output bias voltage adjusted color signals; an signal extracting circuit for extracting the first clock signal and the monitor control information signal from the bias voltage adjusted color signals; a micro controller for receiving the first clock signal and the monitor control information signal from the extracting circuit during a vertical synchronization period of the synchronizing signals, and generating a second clock signal and a plurality of function control signals corresponding to the first clock signal and the monitor control information signal, respectively, while the monitor control information signal is effective; and a monitor function adjusting circuit responsive to the function control signals, for adjusting functions of the monitor control apparatus in synchronization with the second clock signal so as to display information on the screen. The monitor control device allows the user to control a variety of monitor functions from the host computer without the use of a RS232C cable and its RS232C interface between the monitor and the host computer.

20 Claims, 5 Drawing Sheets

APPARATUS AND METHOD FOR CONTROLLING A MONITOR USING FIRST AND SECOND COLOR SIGNALS

This application makes reference to, incorporates the same herein, and claims all benefits accruing under 35 U.S.C. §119 from an application entitled Apparatus and Method for Controlling a Monitor earlier filed in the Korean Industrial Property Office on Feb. 17, 1996 and Mar. 29, 1996, and there duly assigned Serial No. 96-3967 and 96-9318 by that Office.

BACKGROUND OF THE INVENTION

1. Technical Field

The present invention relates to a general purpose computer system, and more particularly, relates to a monitor control device which receives video and synchronizing signals from a host computer to provide a visual display of information on a monitor, and a method for controlling the monitor.

2. Background Art

Conventional monitors, both color and monochrome, typically have built-in control inputs for manual user adjustments of display parameters such as contrast, brightness, picture position including horizontal and vertical positioning, size, tint, color balance, focus, degauss, video cutoff, video gain, tilt, parallelogram, trapezoid distortion adjustment, inter alia. Multi frequency monitors have several control inputs which increase the number of combinations of adjustments that a user can make. These control inputs are typically rotary potentiometers, and may be mounted at different locations around the case of the monitor as determined by each manufacturer. They may be located on the front in plane with the display screen, on the side, in the back, or on top of the case, often behind a small panel where the user may open to access the controls.

In a cathode ray tube (CRT) monitor, the control inputs for contrast and brightness typically interact with video circuitry in the monitor, and modulate the signal by varying electrical potential that effect the formation of an on-screen image. The brightness control, for example, adjusts the level of the scanning electron beam, which in turn makes the on-screen image brighter or less bright. Contrast is the linear relationship between incoming video dot data signal strength and the current screen brightness. In addition to brightness and contrast control inputs, there are also control inputs for position and sizing, which allow the user to alter the position of the display on the screen and to adjust the height and width of the display area on the screen.

Generally, a CRT monitor is connected to a host computer through a video graphics array (VGA) cable which is used to transfer video signals and a dedicated control cable such as a RS232C cable which is used to transfer control information from the host computer to the monitor. When a RS232C cable is used to transfer control information from the host computer to the monitor, an RS232C port must be established between the host computer and an RS232C interface contained in the monitor which typically results in an increase of production cost. In addition, since the control inputs are mounted on the monitor, it is necessary for the user to reach to the monitor, sometimes to different locations around its case, to find the proper control switches of the monitor to operate the switches when the adjustment of any one of the display contrast, brightness, position, size, tint, color balance, focus, degauss, video cutoff, video gain, tilt, parallelogram, and trapezoid distortion is required. Moreover, since the control inputs are mounted on the monitor with a limited number of control switches, it is impossible for the user to control all the monitor functions sometimes.

Recent efforts in the art such as U.S. Pat. No. 5,550,556 for Transmitting Data And Commands To Display Monitors issued to Wu et al., U.S. Pat. No. 5,532,719 for Remote Control Of Display Functions issued to Kikinis, and U.S. Pat. No. 5,457,473 for Image Display Apparatus issued to Arai et al., have endeavored to provide an image display device for adjusting display parameters for a display monitor without having to access control inputs mounted on the monitor. For example, in Wu et al., U.S. Pat. No. 5,550,556, the display parameters are adjusted by way of software control. Similarly, both Kikinis, U.S. Pat. No. 5,532,719 and Arai et al., U.S. Pat. No. 5,457,473 allow the user to input control instructions for adjusting the display picture from an input unit such as a keyboard. While each of these patents has its own merits, I believe that further improvements can still be made to effectively and efficiently control a variety of display functions of the monitor without the use of a RS232C cable and its interface between the monitor and the host computer.

SUMMARY OF THE INVENTION

Accordingly, it is therefore an object of the present invention to provide an improved monitor control device capable of controlling a variety of display functions of a monitor without the use of a RS232C cable and its interface between the monitor and a host computer.

It is also an object to provide a monitor controlling method which is adapted to easily control a variety of monitor functions of a monitor using a host computer.

These and other objects of the present invention can be achieved by a monitor control device incorporated into a CRT-type of monitor which includes a terminal for receiving a composite signal from an external computer through a cable in which the composite signal comprises video signals including control data representing operating characteristics of a data display and synchronizing signals; a polarity converter for converting polarities of the synchronizing signals into synchronizing signals having the same polarity therein; a bias adjusting circuit for receiving a first color signal including a first clock signal and a second color signal including the control data from the video signals, and for adjusting respective direct current bias voltages of the first and the second color signals so as to generate bias voltage adjusted color signals; a signal extracting circuit for extracting the first clock signal and the control data from the bias voltage adjusted color signals; a monitor controller for receiving the first clock signal and the control data from the signal extracting circuit during a vertical synchronization period of the synchronizing signals, and for generating a second clock signal and a plurality of discrete monitor control signals each representing a different operating characteristic of the data display in correspondence with the first clock signal and the control data, respectively; and a monitor function adjusting circuit for adjusting the operating characteristics of the data display according to the monitor control signals in synchronization with the second clock signal.

According to one aspect of the present invention, the control data contains a start code representing a start portion, a control code representing an adjustment request of the data display in a specific operating characteristic, a control value representing an adjustment value, and a check code indicating whether the control code and the control value are valid. Each control code represents an adjustment request of the data display for adjusting one of display brightness, display contrast, horizontal position, horizontal size, vertical position, vertical size, pin cushion, trapezoid distortion, parallel degree, pin balance, tilt, vertical linearity, horizontal focus, vertical focus, horizontal conversion, discrete color cut-off, and discrete color gain. The monitor controller seeks to adjust the operating characteristics of the data display by comparing the start code of the control data with a preset comparison code, reading sequentially the control code, the control value and the check code when the start code corresponds to the preset comparison code, and then generating the second clock signal and the plurality of discrete monitor function signals to the monitor function adjusting circuit for picture adjustment when the check code validates the validity of the control code and the control value.

According to another aspect of the present invention, the monitor function adjusting circuit as constructed according to the principles of the present invention includes a deflection circuit for adjusting horizontal and vertical deflection of the data display; a degauss circuit for eliminating magnetic field remaining in the data display; a video amplifier for producing amplified video signals by amplifying discrete color components of the video signals; a video and on-screen display mixer for mixing the amplified video signals and on-screen display information to generate mixed signals; and a video cut-off circuit for adjusting direct current levels of the mixed signals to thereby adjust the operating characteristics of the data display according to the monitor control signals.

The present invention is more specifically described in the following paragraphs by reference to the drawings attached only by way of example.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
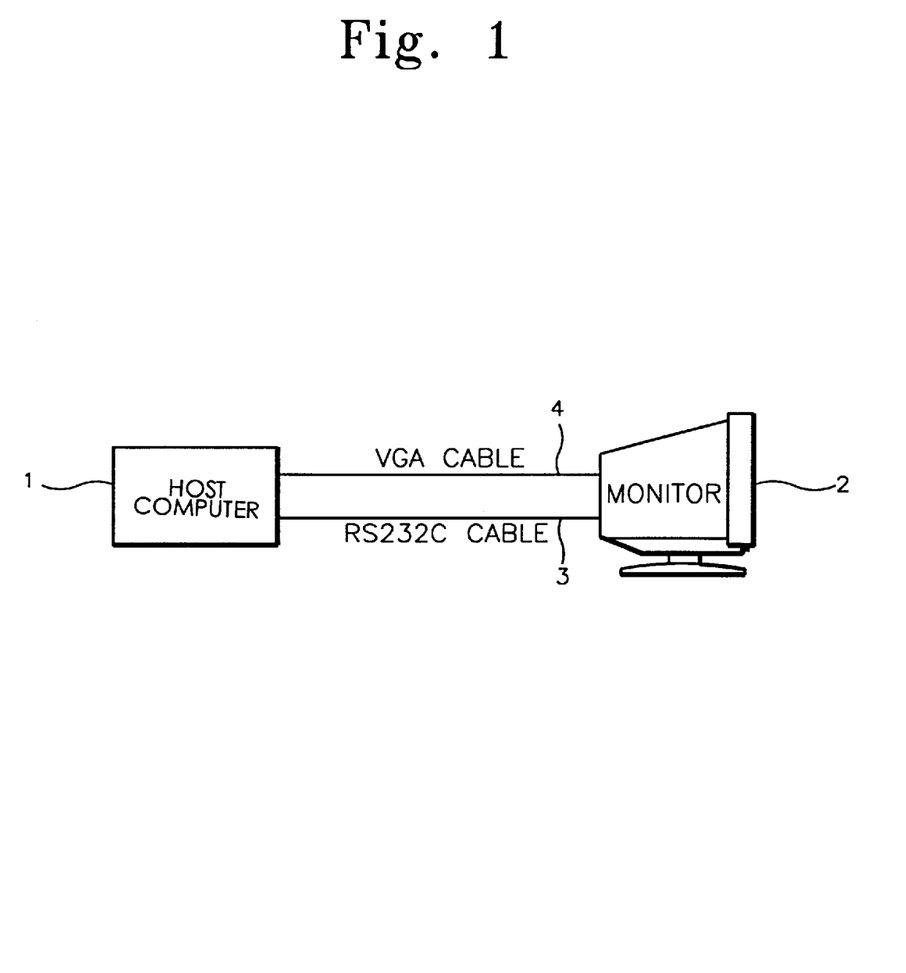
FIG. 1 illustrates a combination of a host computer connected to a CRT-type of monitor having an exemplary monitor control device incorporated therein through a VGA cable and a RS232C cable.

Referring now to the drawings, and particularly to FIG. 1 which illustrates a combination of a host computer 1 connected to a CRT-type of monitor 2 having an exemplary monitor control device incorporated therein through a VGA cable 4 and a RS232C cable 5. When a RS232C cable is used to transfer control information from the host computer to the monitor, an RS232C port must be established between the host computer and a RS232C interface contained in the monitor which typically results in an increase of production cost. In addition, since the control inputs are mounted on the monitor, it is necessary for the user to reach to the monitor, sometimes to different locations around its case, to find the proper control switches of the monitor to operate the switches when the adjustment of any one of the display contrast, brightness, position, size, tint, color balance, focus, degauss, video cutoff, video gain, tilt, parallelogram, and trapezoid distortion is required. Moreover, since the control inputs are mounted on the monitor with a limited number of control switches, it is impossible for the user to control all the monitor functions sometimes.

Figure 2:
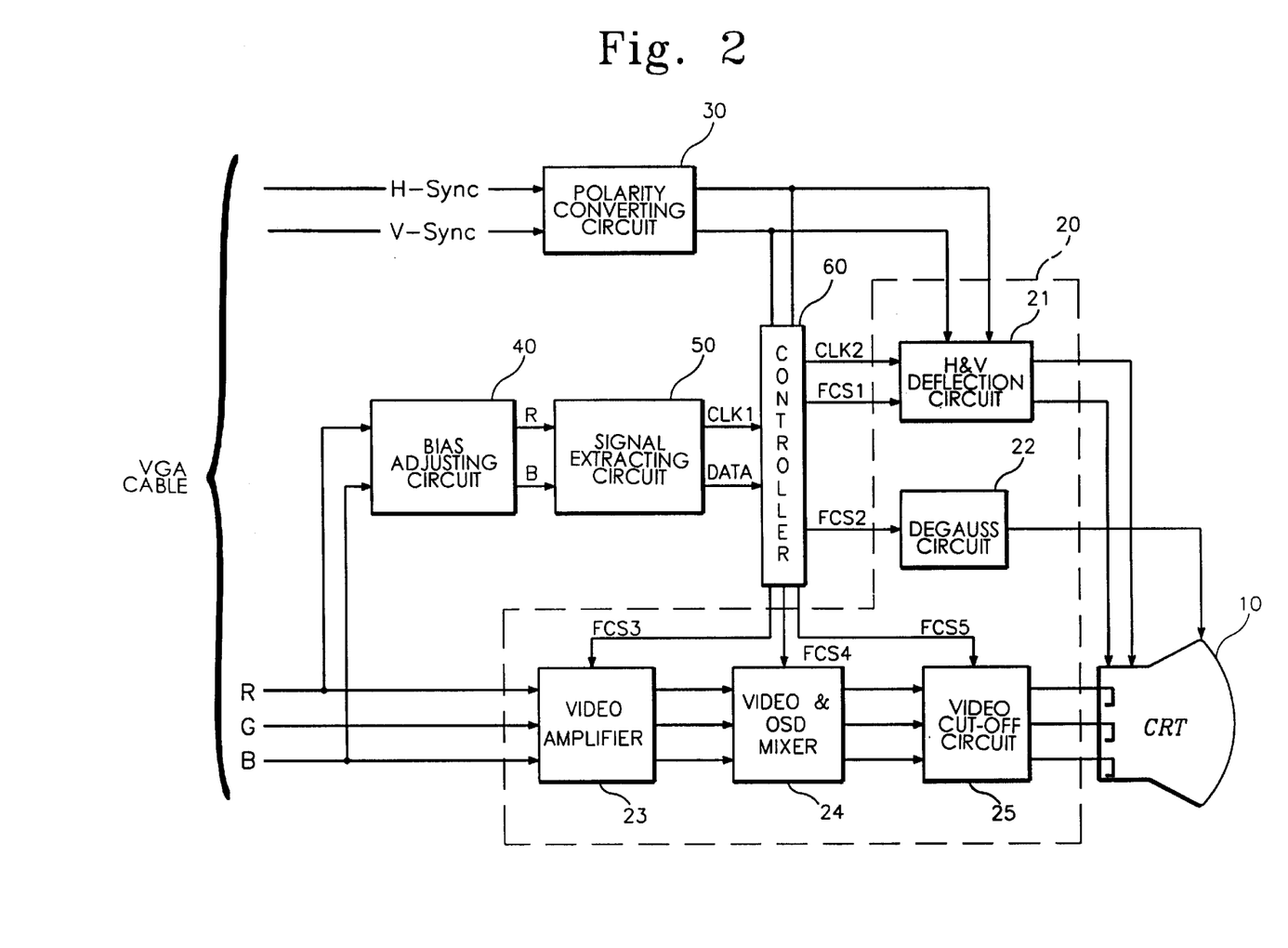
FIG. 2 illustrates a novel monitor control device incorporated in a CRT-type of monitor constructed according to the principles of the present invention.

Refer now to FIG. 2 which illustrates a novel monitor control device incorporated in a CRT-type of monitor as constructed according to the principles of the present invention. The novel monitor control device as incorporated in a CRT-type of monitor is connected to a host computer through a video cable (e.g., VGA cable) to receive two types of signals, one of which is a composite red (R) color signal mixed with a clock signal, and the other of which is a composite blue (B) color signal mixed with a control information signal. When monitor control information for the monitor is input into the host computer by the user, the clock and the control information signals are provided from the host computer and used as a monitor control signal in the monitor. The monitor control device then extracts the clock and the control information signals from the composite signals by way of a signal extracting circuit 50 to provide the extracted signals to a microcontroller 60. The microcontroller 60 then controls all kinds of monitor functions in response to the extracted signals.

As shown in FIG. 2, the monitor control device receives R, G (green) and B color signals, and horizontal and vertical synchronizing signals H-Sync and V-Sync from the video cable. The monitor function adjusting circuit 20 includes a horizontal & vertical deflection circuit 21 for adjusting horizontal and vertical deflection of a CRT 10, a degauss circuit 22 for eliminating the remaining magnetic field on the CRT 10, a video amplifier 23 for amplifying the R, G and B-color signals, respectively, a video and on-screen display (OSD) mixer 24 for mixing the amplified color signals and an OSD information signal to generate mixed signals, and a video cut-off circuit 25 for adjusting direct current (DC) levels of the mixed signals from the video & OSD mixer 24.

The horizontal and vertical synchronizing signals H-Sync and V-Sync received from the video cable are provided to a polarity converter 30 and then conversely changed in polarity by way of the polarity converter 30. Two composite color signals, for example, composite R and B color signals, of the color signals received from the video cable are applied to the bias adjusting circuit 40 for adjustment to zero voltage by a DC bias voltage provided by the bias adjusting circuit 40. The bias adjusted composite R and B-color signals are applied to the signal extracting circuit 50 so that clock signal CLKI and control information signal DATA are extracted from the bias adjusting composite R and B color signals, respectively.

Figure 3:
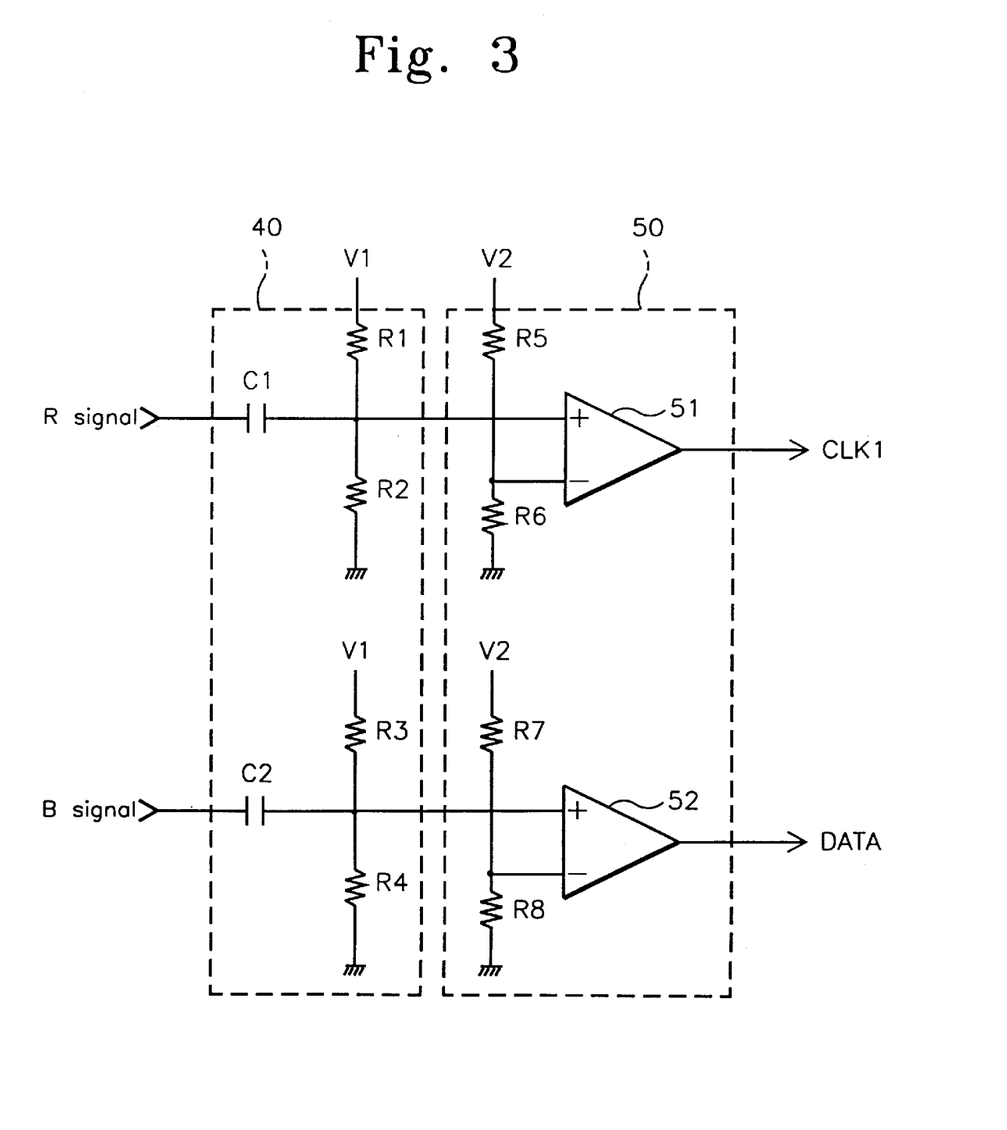
FIG. 3 is a detailed circuit diagram of the bias adjusting circuit and the signal extracting circuit as shown in FIG. 2.

FIG. 3 illustrates a detailed circuit diagram of the bias adjusting circuit 40 and the signal extracting circuit 50 of the monitor control device as shown in FIG. 2. The bias adjusting circuit 40 includes two adjusting circuit portions having the same construction, one of which is provided to adjust the DC bias voltage of the composite R-color signal to zero voltage, and the other of which is provided to adjust the DC bias voltage of the composite B-color signal to zero voltage. Each of the two adjusting circuit portions includes resistance-capacitance (RC) circuit each desirably having one capacitor C1 (or C2), and two resistors R1 and R2 (or R3 and R4). The two resistors R1 and R2 (or R3 and R4) are serially connected between a voltage source V1 and a ground.

Separately, the signal extracting circuit 50 includes two extracting circuit portions having the same construction, one of which is provided to extract the clock signal CLK1 from the bias adjusted composite R-color signal, and the other to extract the control information signal DATA from the bias adjusted composite B-color signal. Each of the extracting circuit portions has one comparator 51 (or 52) and two resistors R5 and (or R7 and R8) (or R7 and R8). The two resistors R5 and R6 are serially connected between another voltage source V2 and the ground to generate a reference voltage. The bias adjusted composite R-color signal and the reference voltage are compared with each other by way of a first comparator 51, so that the clock signal CLK1 contained in the composite R-color signal can be extracted. Additionally, the bias adjusted composite B-color signal and the reference voltage applied from the connection of the resistors R7 and R8 are compared with each other by way of a second comparator 52, so that the control information signal DATA contained in the composite B-color signal can be extracted.

In the meantime, the control information signal DATA is made of, for example, four byte signals as depicted below.

TABLE 1

| 1st Byte | 2nd Byte | 3rd Byte | 4th Byte |
| --- | --- | --- | --- |
| start code | control code | control value | check sum |

As can seen from Table 1, the first byte represents a start code that is indicative of the start portion of the control information signal DATA. The second byte represents a control code indicative of a control item. The third byte is indicative of a control value and the fourth byte represents a check sum that is indicative of whether control code and control value are valid.

The control code is designated in the form of Table 2, as depicted below, depending on the control item as shown in Table 2 below.

TABLE 2

| adjusting item | hexadecimal code | adjusting item | hexadecimal code |
| --- | --- | --- | --- |
| horizontal position | 10 | vertical focus | 26 |
| horizontal size | 12 | horizontal conversion | 28 |
| vertical position | 14 | R-cut off | 30 |
| vertical size | 16 | G-cut off | 32 |
| side pincushion | 18 | B-cut off | 34 |
| trapezoid distortion | 1A | R-gain | 36 |
| parallel degree | 1C | G-gain | 38 |
| pin balance | 1E | B-gain | 40 |
| tilt | 20 | contrast | 42 |
| vertical linearity | 22 | brightness | 44 |
| horizontal focus | 24 | | |

For example, in case of adjustment of, for example, a horizontal position of monitor control functions, the control code is 10 of hexadecimal digit, and in case of adjustment of a horizontal size is 12 of hexadecimal digit. Similarly, in case of adjustment of a picture contrast or a picture brightness, the control code is either 42 or 44 of hexadecimal digit The microcontroller 60 receives the control signal CLK1 and the control information signal DATA when the level of the V-Sync signal is transited. If the check sum of the control information signal DATA is valid, the microcontroller 60 generates a clock signal CLK2 and monitor control signals FCS1–FCS5 in response to the clock signal CLK1 and the control information signal DATA. The signals from the microcontroller 60 are provided to the monitor function adjusting circuit 20.

Figure 4:
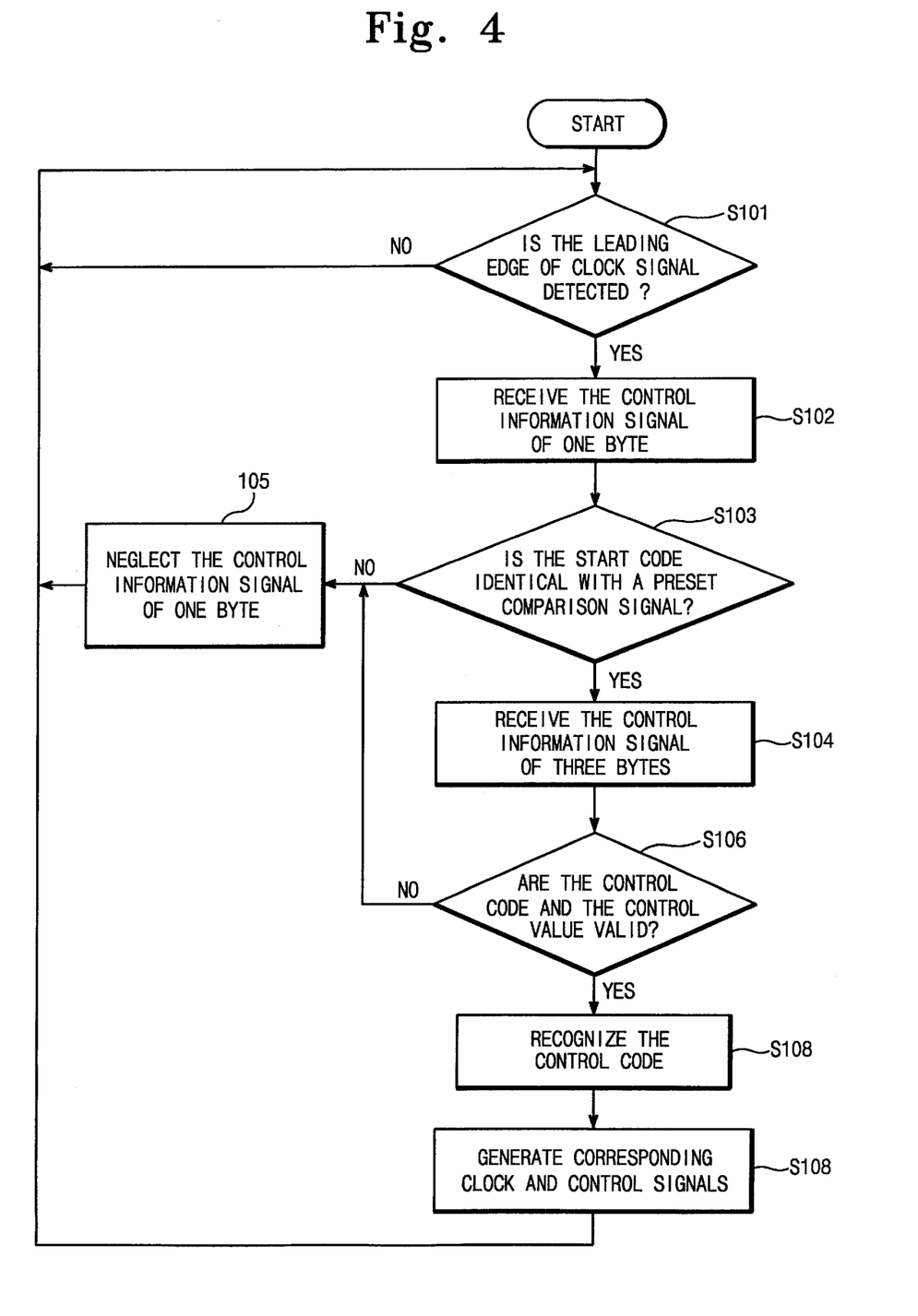
FIG. 4 is a flow chart illustrating a process of generating clock and monitor control signals by the microcontroller as shown in FIG. 2.
Figure 5:
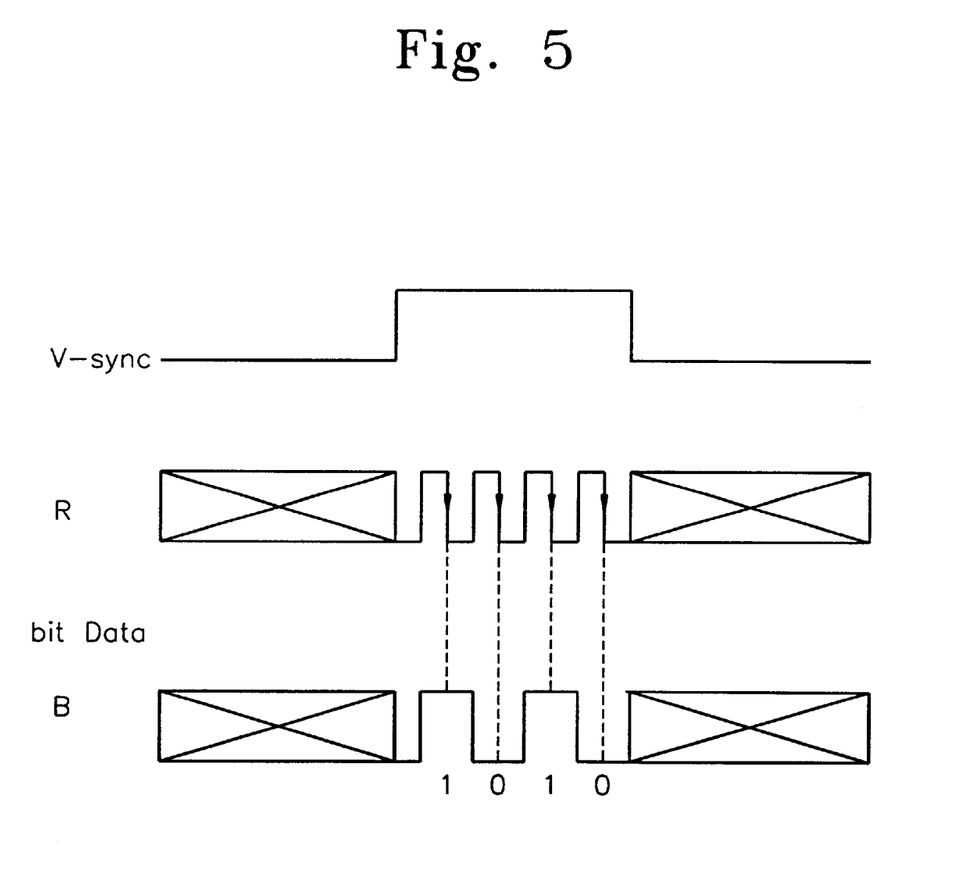
FIG. 5 is a timing diagram illustrating a process of extracting clock and control information signals from the composite red (R) and blue (B) color signals at the leading edge of the vertical synchronizing V-Sync signal by the bias adjusting circuit and the signal extracting circuit as shown in FIG. 2.

The operation of the microcontroller 60 will now be described in detail with reference to FIG. 4 and 5 hereinbelow.

First, the microcontroller 60 detects the leading edge of the vertical synchronizing V-Sync signal from the polarity converter 30 at step S101. If the leading edge of the vertical synchronizing V-Sync signal is detected, the controller 60 proceeds to step S102 to start counting the pulse number of the clock signal CLK1 extracted from the composite R-color signal at the leading edge of the V-Sync signal as shown in FIG. 5. At this point, the microcontroller 60 recognizes only four pulses as a valid pulse signal. During a period of this four pulses, the controller 60 receives the control information signal DATA, which is extracted from the composite B-color signal, in synchronization with the clock signal CLK1, as shown in FIG. 5.

As stated above, during the presence of the two V-Sync signals continued thus, the controller 60 receives the control information signal of one byte which is indicative of a start code thereof. At step S103, the controller 60 compares whether the start code is identical with a preset comparison signal. If the start code is identical with the preset comparison signal, the controller 60 proceeds to step S104 to receive the control information signal of three bytes, more specifically, a control code, a control value and a check sum as in the above described manner. If the start code is not identical with the preset comparison signal, the controller 60 proceeds to step S105 to neglect the control information signal of one byte and returns to step S101.

After the controller 60 receives the control information signal of three bytes, including a control code, a control value and a check sum at step S104, the controller 60 determines whether the control code and the control value are valid on the basis of the check sum at step S106. If the control code and the control value are valid, the controller 60 recognizes the control code at step S107 and then generates, at step S108 in response to the control code, corresponding clock and the monitor control signals CLK2 and FCS1–FCS5 which are provided to adjust the monitor control functions. The monitor function adjusting circuit 20 receives the clock and the monitor control signals CLK2 and FCS1–FCS5 to adjust the monitor control functions as described by Table 2.

If the control code and the control value are invalid at step S106 the controller 60 proceeds to step S105 to neglect the control information signal of three bytes and subsequently returns to step S101. As described in an example above, it is noted that a clock signal and a control information signal from the host computer are mixed with R and B-color signals, respectively. However, the signals from the host computer can be mixed with any two color signals of R, G and B-color signals, respectively. In addition, the V-Sync and H-Sync signals can be mixed with each other, or with at least one of the R, G and B-color signals. In this case, the monitor control device as constructed according to the present invention requires a circuit for extracting the V-Sync and the H-Sync signals from a composite signal.

As described above, the monitor control device incorporated into the CRT-type of monitor as constructed according to the principles of the present invention advantageously allows the user to adjust monitor control functions by way of a control information signal from a host computer connected to the CRT-type of monitor via a video cable. As a result, the monitor control device does not need an RS232C interface circuit and an RS232C cable between the monitor and the host computer. In addition, it is now possible for the user to conveniently adjust a variety of monitor control functions from the host computer without having to manually access to control inputs of the monitor.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A monitor control device for a monitor, comprising:
   a terminal for receiving a composite signal from an external computer through a cable, said composite signal comprising video signals including control data representing operating characteristics of a data display and synchronizing signals;
   a polarity converter for converting polarities of the synchronizing signals into synchronizing signals having the same polarity;
   a bias adjusting circuit for receiving a first color signal including a first clock signal and a second color signal including the control data from the video signals, and said bias adjusting circuit for adjusting respective direct current bias voltages of the first color signal and the second color signal so as to generate bias voltage adjusted color signals;
   a signal extracting circuit for extracting the first clock signal and the control data from the bias voltage adjusted color signals;
   a monitor controller for receiving the first clock signal and the control data from said signal extracting circuit during a vertical synchronization period of the synchronizing signals, and said monitor controller for generating a second clock signal and a plurality of discrete monitor control signals each representing a different operating characteristic of said data display in correspondence with the first clock signal and the control data, respectively; and
   a monitor function adjusting circuit for adjusting the operating characteristics of said data display according to the monitor control signals in synchronization with the second clock signal.

2. The monitor control device of claim 1, further comprised of said bias adjusting circuit including means for adjusting the direct current bias voltages of the first color signal and the second color signal to a zero voltage so as to generate the bias voltage adjusted color signals.

3. The monitor control device of claim 1, further comprised of said control data including a start code representing a start portion of said control data, a control code representing an adjustment request of said data display in a specific operating characteristic, a control value representing an adjustment value, and a check code indicating whether the control code and the control value are valid.

4. The monitor control device of claim 3, further comprised of said control code representing an adjustment request of said data display for adjusting one of display brightness, display contrast, horizontal position, horizontal size, vertical position, vertical size, pin cushion, trapezoid distortion, parallel degree, pin balance, tilt, vertical linearity, horizontal focus, vertical focus, horizontal conversion, discrete color cut-off, and discrete color gain.

5. The monitor control device of claim 1, further comprised of said signal extracting circuit including means for comparing each of the first color signal and the second color signal with a reference signal so as to extract the first clock signal and the control data from the bias voltage adjusted color signals.

6. The monitor control device of claim 1, further comprised of said polarity converter further converting different polarities of the synchronizing signals into one of positive polarities and negative polarities.

7. The monitor control device of claim 1, further comprised of said monitor controller receiving the first clock signal and the control data from said signal extracting circuit at a leading edge of said vertical synchronization period of the synchronizing signals.

8. The monitor control device of claim 4, further comprised of said monitor controller adjusting the operating characteristics of said data display by:
   comparing the start code of the control data with a preset comparison code;
   reading sequentially the control code, the control value and the check code from said signal extracting circuit when the start code corresponds to the preset comparison code; and
   generating the second clock signal and the plurality of discrete monitor control signals to said monitor function adjusting circuit when the check code validates the control code and the control value.

9. The monitor control device of claim 1, further comprised of said monitor function adjusting circuit comprising:
   a deflection circuit for adjusting horizontal deflection and vertical deflection of said data display;
   a degauss circuit for eliminating a magnetic field remaining on said data display;
   a video amplifier for producing amplified video signals by amplifying discrete color components of the video signals;
   a video and on-screen display mixer for mixing the amplified video signals and on-screen display information to generate mixed signals; and
   a video cut-off circuit for adjusting direct current levels of the mixed signals to thereby adjust the operating characteristics of said data display according to the monitor control signals.

10. The monitor control device of claim 1, further comprised of said synchronizing signals corresponding to horizontal synchronizing signals and vertical synchronizing signals separated from each other.

11. The monitor control device of claim 1, further comprising means for separating the video signals and the synchronizing signals from said composite signal.

12. A method of controlling a monitor control device incorporated in a cathode-ray tube monitor, comprising the steps of:

receiving video signals and synchronizing signals from a host computer to provide a data display;

extracting a first clock signal and a monitor control signal from first color signal and a second color signal during a vertical synchronization period of the synchronizing signals, said monitor control signal including a first information signal indicating a starting portion for said monitor control signal, a second information signal indicating control information, a third information signal indicating a control value, and a fourth information signal indicating whether the second information signal and the third information signal are effective;

comparing said first information signal with a comparison information signal;

determining whether said fourth information signal validates the effectiveness of said second information signal and said third information signal when said first information signal corresponds with said comparison information signal; and providing a second clock signal and a plurality of discrete monitor function signals corresponding to said second information signal and said third information signal for enabling picture adjustment of said data display when said second information signal and said third information signal are validated as being effective.

13. The method of claim 12, further comprised of said first color signal and said second color signal respectively representing two color signals selected from red, green and blue color signals.

14. The method of claim 12, further comprising the step of disregarding said second information signal and said third information signal when said fourth information signal does not validate the effectiveness of said second information signal and said third information signal.

15. A video display system, comprising:

means for receiving a composite signal from an external computer through a cable, said composite signal comprising video signals including control data representing operating characteristics of a data display and synchronizing signals;

means for separating a first clock signal and the control data from the video signals;

controller means for receiving the first clock signal and the control data during a vertical synchronization period of the synchronizing signals, and said controller means for generating a second clock signal and a plurality of discrete monitor control signals each representing a different operating characteristic of said data display;

converter means for converting polarities of the synchronizing signals into synchronizing signals having the same polarity to produce said vertical synchronization period;

bias adjusting means for receiving a first color signal including said first clock signal and a second color signal including the control data from the video signals and said bias adjusting means for adjusting respective direct current bias voltages of the first color signal and the second color signal so as to generate bias voltage adjusted color signals;

signal extracting means for extracting the first clock signal and the control data from the bias voltage adjusted color signals; and monitor function adjusting means for adjusting the operating characteristics of said data display according to the monitor control signals in synchronization with the second clock signal.

16. The video display system of claim 15, further comprised of said bias adjusting means including a first resistance-capacitance circuit and a second resistance-capacitance circuit connected in parallel for respectively adjusting the direct current bias voltages of the first color signal and the second color signal to a zero voltage so as to generate the bias voltage adjusted color signals, and said signal extracting means including a first comparator and a second comparator connected in parallel for respectively comparing each of the first color signal and the second color signal with a reference signal so as to extract the first clock signal and the control data from the bias voltage adjusted color signals.

17. The video display system of claim 15, further comprised of said control data including a start code representing a start portion of said control data, a control code representing an adjustment request of said data display in a specific operating characteristic, a control value representing an adjustment value, and a check code indicating whether the control code and the control value are valid.

18. The video display system of claim 17, further comprised of said control code representing an adjustment request of said data display for adjusting one of display brightness, display contrast, horizontal position, horizontal size, vertical position, vertical size, pin cushion, trapezoid distortion, parallel degree, pin balance, tilt, vertical linearity, horizontal focus, vertical focus, horizontal conversion, discrete color cut-off, and discrete color gain.

19. The video display system of claim 18, further comprised of said controller means adjusting the operating characteristics of said data display by:

comparing the start code of the control data with a preset comparison code;

reading sequentially the control code, the control value and the check code from said signal extracting means when the start code corresponds to the preset comparison code; and generating the second clock signal and the plurality of discrete monitor control signals to said monitor function adjusting means when the check code validates the control code and the control value.

20. The video display system of claim 15, further comprised of said monitor function adjusting means comprising:

a deflection circuit for adjusting horizontal deflection and vertical deflection of said data display;

a degauss circuit for eliminating a magnetic field remaining on said data display;

a video amplifier for producing amplified video signals by amplifying discrete color components of the video signals;

a video and on-screen display mixer for mixing the amplified video signals and on-screen display information to generate mixed signals; and a video cut-off circuit for adjusting direct current levels of the mixed signals to thereby adjust the operating characteristics of said data display according to the monitor control signals.

* * * * *